United States Patent
Iwata et al.

(10) Patent No.: US 11,325,365 B1
(45) Date of Patent: May 10, 2022

(54) LAMINATING APPARATUS

(71) Applicant: Nikko-Materials Co., Ltd., Kanagawa (JP)

(72) Inventors: Kazutoshi Iwata, Kanagawa (JP); Yoshiaki Honma, Kanagawa (JP); Takeshi Yamaguchi, Kanagawa (JP)

(73) Assignee: NIKKO-MATERIALS CO., LTD., Kanagawa (JP)

( * ) Notice: Subject to any disclaimer, the term of this patent is extended or adjusted under 35 U.S.C. 154(b) by 0 days.

(21) Appl. No.: 17/176,387

(22) Filed: Feb. 16, 2021

(51) Int. Cl.
 *B32B 37/10* (2006.01)
 *B32B 37/06* (2006.01)
 *B32B 39/00* (2006.01)
 *B32B 37/28* (2006.01)

(52) U.S. Cl.
 CPC .......... *B32B 37/1009* (2013.01); *B32B 37/06* (2013.01); *B32B 37/28* (2013.01); *B32B 39/00* (2013.01); *B32B 2309/68* (2013.01)

(58) Field of Classification Search
 CPC ..... B32B 37/1009; B32B 39/00; B32B 37/28; B32B 37/06; B32B 2309/68
 See application file for complete search history.

(56) References Cited

U.S. PATENT DOCUMENTS

| | | | |
|---|---|---|---|
| 2010/0018646 A1* | 1/2010 | Metzger | B32B 37/10 156/382 |
| 2018/0162111 A1 | 6/2018 | Iwata et al. | |

FOREIGN PATENT DOCUMENTS

| | | | |
|---|---|---|---|
| CN | 101384416 A | * | 3/2009 |
| JP | 2002120100 A | * | 4/2002 |
| JP | 2004-058349 | | 2/2004 |
| JP | 2004-148398 | | 5/2004 |
| JP | 2008-221840 | | 9/2008 |
| JP | 4926840 | | 5/2012 |
| JP | 2020-28980 | | 2/2020 |
| WO | 2016/199687 | | 12/2016 |

OTHER PUBLICATIONS

JP2002120100A Machine Translation of Description (EPO Google) (Year: 2021).*
CN101384416A Machine Translation of Description (EPO Google) (Year: 2021).*

* cited by examiner

*Primary Examiner* — Cynthia L Schaller
(74) *Attorney, Agent, or Firm* — Wenderoth, Lind & Ponack, L.L.P.

(57) ABSTRACT

A laminating apparatus is provided, which is capable of producing a laminate having a highly planarized surface. The laminating apparatus is arranged to laminate a film on an irregular surface of a substrate having irregularities, and includes a vacuum laminating device which brings the film into close conformal contact with the substrate under reduced pressure to form a first temporary laminate, a first flat press device which presses the first temporary laminate to form a second temporary laminate having a substantially planarized irregular surface, and a second flat press device which presses the second temporary laminate under different conditions from the first flat press device to form a product laminate having a planar surface.

4 Claims, 7 Drawing Sheets

RELATED ART

FIG. 7C

RELATED ART

LAMINATING APPARATUS

TECHNICAL FIELD

The present disclosure relates to a laminating apparatus which is capable of precisely laminating a resin film on a substrate. More specifically, the present disclosure related to a laminating apparatus which is capable of more precisely planarizing a surface of a resin film laminated on a substrate (e.g., a printed circuit board or a wafer).

BACKGROUND ART

With size reduction and performance improvement of electronic devices, highly-dense multilayer printed wiring boards (so-called buildup boards) are conventionally widely used as electronic circuit boards to be mounted on the electronic devices. Such a buildup board is produced as a laminate by alternately stacking (laminating) resin films as insulation layers and substrates having irregular surfaces provided with wirings and the like by means of a laminating apparatus.

For the production of the buildup board, it is important to laminate a resin film planarly on a substrate having irregularities. If resin films and substrates each having nonplanar areas are stacked together into a multilayer buildup board, unnecessary voids are built up. Therefore, the buildup board is liable to be bulky, failing to satisfy the requirement for the size reduction of the electronic devices. A laminating apparatus for laminating a resin film planarly on a substrate having irregularities is disclosed, for example, in JP 4926840B2. The laminating apparatus includes a vacuum press device and a flat press device, so that the laminate (buildup board or the like) can be formed as having a planar surface.

With recent further size reduction and further performance improvement of the electronic devices, electronic circuit boards to be mounted on the electronic devices are required to achieve further size reduction. Accordingly, the laminate (buildup board or the like) is required to have a higher surface planarity. Therefore, it is desired to improve the laminating technique by improving the laminating apparatus.

SUMMARY

In view of the foregoing, it is an object of the present disclosure to provide a laminating apparatus which is capable of producing a laminate having a higher surface planarity.

To achieve the aforementioned object, the present disclosure has the following features [1] to [5].

[1] A laminating apparatus for laminating a film on an irregular surface of a substrate having irregularities includes: a vacuum laminating device which brings the film into close conformal contact with the substrate under reduced pressure to form a first temporary laminate having an irregular surface substantially conformal to the irregular surface of the substrate; a first flat press device which presses the first temporary laminate to substantially planarize the irregular surface of the first temporary laminate to form a second temporary laminate having a substantially planarized irregular surface; and a second flat press device which presses the second temporary laminate under different conditions from the first flat press device to form a product laminate having a planar surface.

[2] In the laminating apparatus described in Item [1], the first flat press device includes a pair of first plates opposed to each other, at least one of the pair of first plates being movable toward and away from the other first plate, at least one of the pair of first plates including a first heating platen, a first plate member, and a first shock absorber provided between the first heating platen and the first plate member, and the second flat press device includes a pair of second plates opposed to each other, at least one of the pair of second plates being movable toward and away from the other second plate, at least one of the pair of second plates including a second heating platen and a second plate member, wherein no shock absorber is provided between the second heating platen and the second plate member or a second shock absorber having a smaller shock absorbing effect than the first shock absorber of the first flat press device is provided between the second heating platen and the second plate member.

[3] In the laminating apparatus described in Item [1] or [2], the first flat press device includes a pair of press blocks opposed to each other and a hydraulic cylinder or an air cylinder connected to at least one of the pair of press blocks, and the at least one of the pair of press blocks is movable toward and away from the other press block by operation of the hydraulic cylinder or the air cylinder.

[4] In the laminating apparatus described in any of Items [1] to [3], the second flat press device includes a pair of press blocks opposed to each other and a servomotor connected to at least one of the pair of press blocks, and the at least one of the pair of press blocks is movable toward and away from the other press block by operation of the servomotor.

[5] In the laminating apparatus described in any of Items [1] to [3], the second flat press device includes a pair of press blocks opposed to each other and a hydraulic cylinder or an air cylinder connected to at least one of the pair of press blocks, and the at least one of the pair of press blocks is movable toward and away from the other press block by operation of the hydraulic cylinder or the air cylinder.

The inventors made efforts to solve the aforementioned problem. As a result, the inventors found that, where the temporary laminate formed by bringing the film into close conformal contact with the substrate under reduced pressure is subjected to a flat press operation at least twice under different conditions in the laminating apparatus, the resulting laminate has a surface planarized to a level that is not achievable by the conventional art.

The laminating apparatus according to the present disclosure is capable of producing a laminate having a highly planar surface when a film is laminated on an irregular surface of a substrate having irregularities.

DESCRIPTION OF EMBODIMENTS

Next, embodiments of the present disclosure will be described in detail. It should be understood that the disclosure be not limited to these embodiments.

Figure 1:
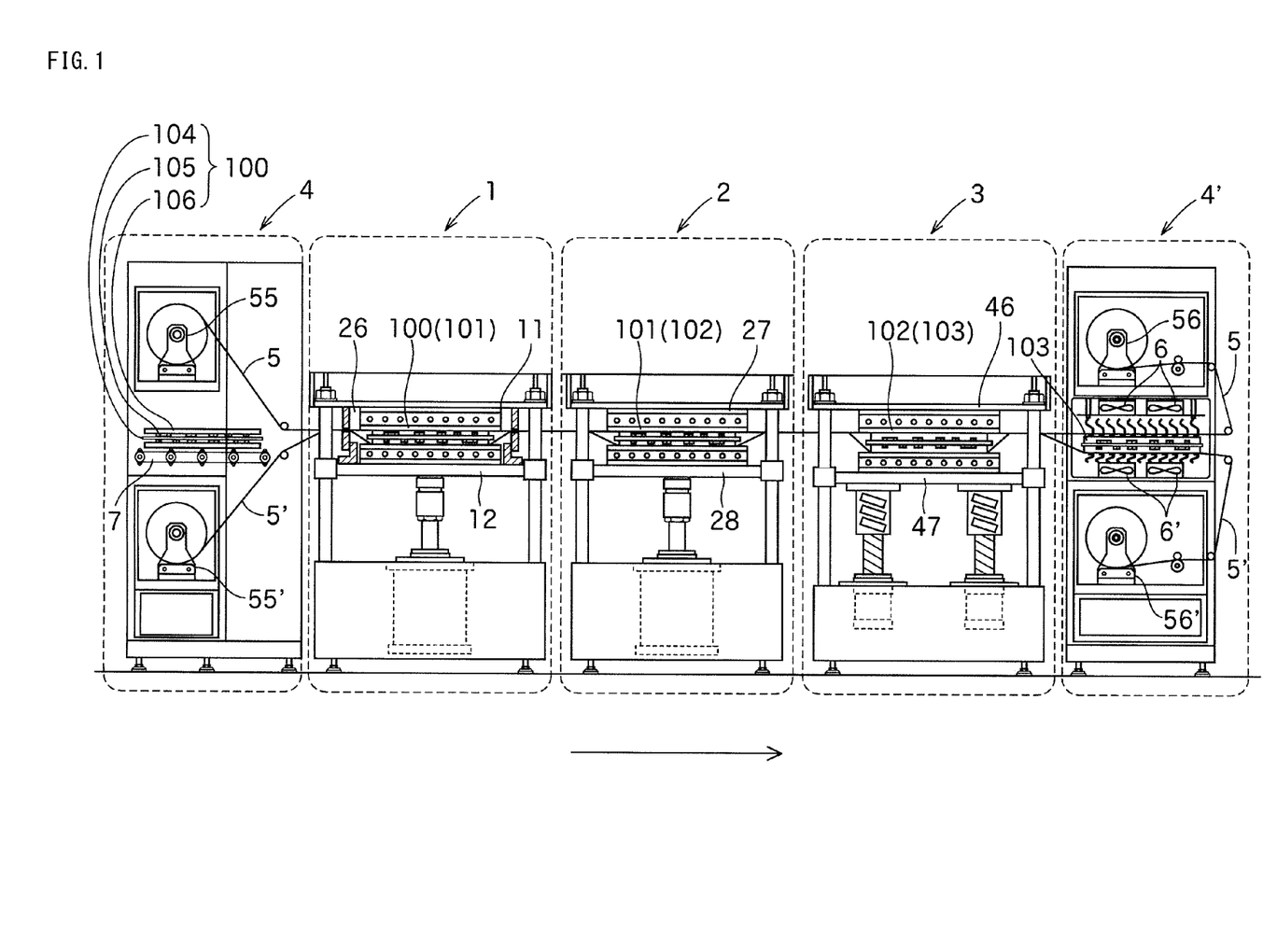
FIG. 1 is a structural diagram for briefly describing a laminating apparatus according to one embodiment of the present disclosure.

FIG. 1 illustrates a laminating apparatus according to one embodiment of the present disclosure. The laminating apparatus is arranged to laminate lamination films 106 on a substrate 104 for a buildup board having irregularities such as wirings. The laminating apparatus includes transportation devices 4, 4' which feed out transportation films 5, 5' from one side, and wind up the transportation films 5, 5' on the other side to sequentially transport workpieces 100. A vacuum laminating device 1, a first flat press device 2, and a second flat press device 3 are disposed in this order in an arrow direction along which the transportation films 5, 5' are fed from an upstream side (vacuum laminating device 1) to a downstream side (second flat press device 3).

A workpiece 100, which includes a substrate 104 having irregular surfaces each provided with a copper pattern 105, and lamination films 106 respectively placed on the irregular surfaces of the substrate 104, is fed into the vacuum laminating device 1. The vacuum laminating device 1 brings the films 106 into close conformal contact with the irregular surfaces of the substrate 104 under reduced pressure to form a first temporary laminate 101 having irregular surfaces substantially conformal to the irregular surfaces of the substrate 104. The first flat press device 2 presses the first temporary laminate 101 formed by the vacuum laminating device 1 to substantially planarize the irregular surfaces of the first temporary laminate 101 to form a second temporary laminate 102 having substantially planarized irregular surfaces. Further, the second flat press device 3 presses the second temporary laminate 102 under different conditions from the first flat press device 2 to further planarize the irregular surfaces of the second temporary laminate 102 to form a product laminate 103 having planar surfaces.

The workpiece 100, the first temporary laminate 101, the second temporary laminate 102, and the product laminate 103 are held between the transportation films 5 and 5', and transported by the transportation devices 4, 4'. The transportation device 4 includes a loading conveyor 7 for loading the workpiece 100 into the process. The transportation device 4' includes fans 6, 6' for cooling the product laminate 103 formed through the planarization by the second flat press device 3. In the transportation device 4', the transportation films 5, 5' are wound up, and the resulting laminate 103 is unloaded through a gap between the transportation films 5 and 5' from the transportation device 4'.

The devices 1 to 3 will hereinafter be described in detail.

[Vacuum Laminating Device 1]

Figure 2:
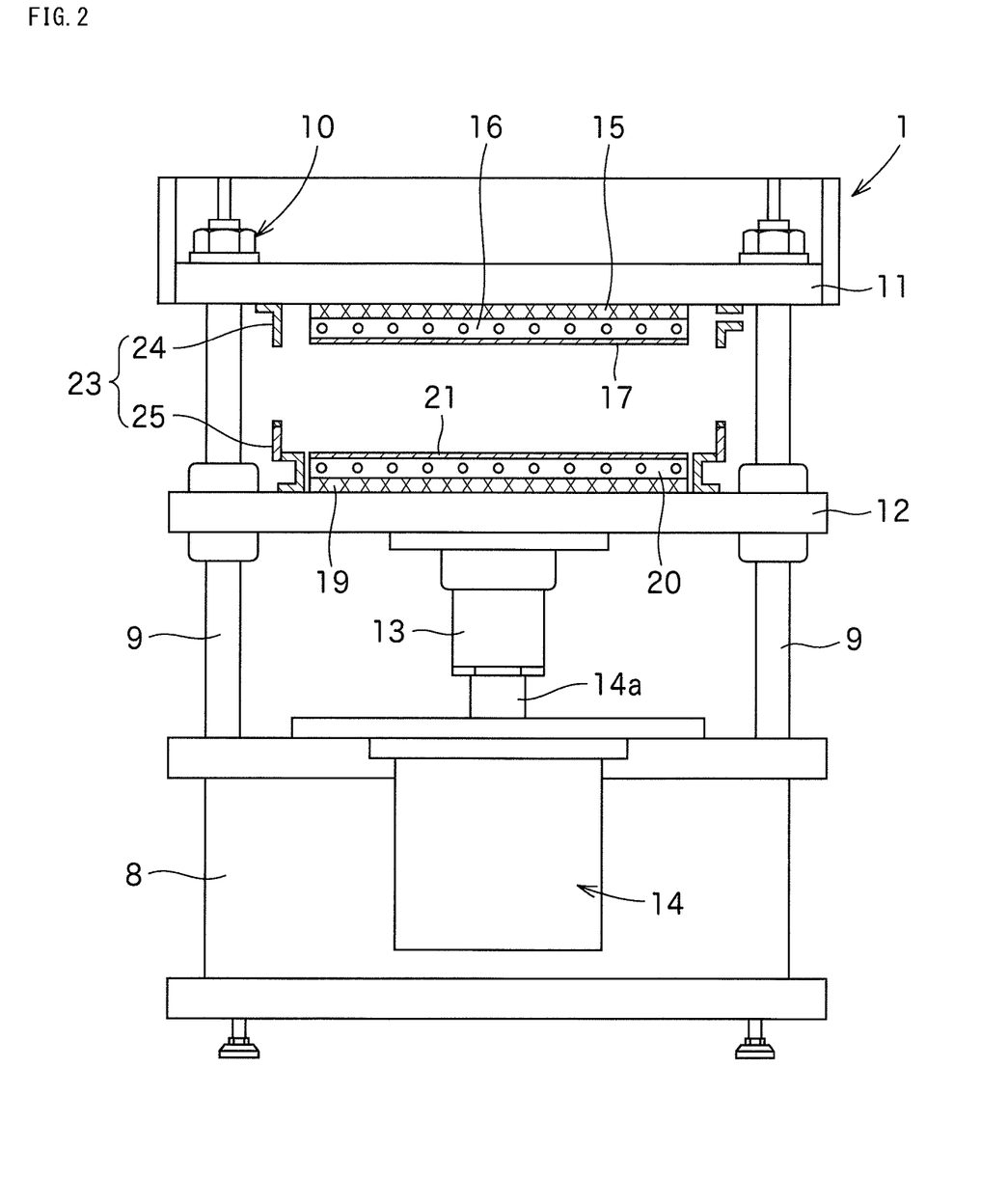
FIG. 2 is an explanatory diagram illustrating a vacuum laminating device of the laminating apparatus.

In the vacuum laminating device 1, the workpiece 100 loaded by the loading conveyor 7 and transported by the transportation films 5, 5' with the films 106 placed on the irregular surfaces of the substrate 104 is positioned between an upper plate 11 and a lower plate 12, and heat-pressed in a chamber 26 under reduced pressure, whereby the films 106 are brought into close conformal contact with the irregular surfaces of the substrate 104. Thus, the first temporary laminate 101 is formed as having the irregular surfaces substantially conformal to the irregular surfaces of the substrate 104. As shown in FIG. 2, the vacuum laminating device 1 includes a plurality of columns 9 (in FIG. 2, only two columns 9 are shown) disposed upright on a press base 8. The upper plate 11 is fixed to the columns 9 by fixtures 10 such as bolts and nuts, and the lower plate 12 is attached to the columns 9 in a vertically movable manner. The lower plate 12 is connected to a hydraulic cylinder 14 via a joint 13, and is moved up and down by operation of the hydraulic cylinder 14 (by upward and downward movement of a piston rod 14a). In this embodiment, the hydraulic cylinder 14 is connected to the lower plate 12, but a different lift mechanism such as air cylinder may be used instead of the hydraulic cylinder 14. However, the hydraulic cylinder 14 advantageously has a compact size and yet is capable of generating a high pressure.

A plate-shaped upper heat insulator 15, an upper heating platen 16, an upper shock absorber, and an upper elastic press plate 17 are fixed to the upper plate 11 in this order from the upper side. A plate-shaped lower heat insulator 19, a lower heating platen 20, a lower shock absorber, and a lower elastic press plate 21 are fixed to the lower plate 12 in this order from the lower side. The upper shock absorber and the lower shock absorber are not shown in FIG. 2.

In the upper and lower heating platens 16, 20, temperature-controllable heating devices are respectively provided at proper positions for heating the elastic press plates 17, 21. In this embodiment, a plurality of sheath heaters are provided as the heating devices within the upper and lower heating platens 16, 20. In this embodiment, the sheath heaters are disposed in the heating platens 16, 20, but some other heat sources may be used instead of the sheath heaters.

The vacuum laminating device 1 includes a movable vacuum frame 23. The movable vacuum frame 23 includes an upper stationary frame portion 24 having a generally rectangular frame shape and gas-tightly fixed to a lower surface of the upper plate 11, and a movable frame portion 25 gas-tightly fixed to an upper surface of the lower plate 12. A vacuum nozzle (not shown) is connected to the upper stationary frame portion 24. With the upper and lower plates 11, 12 in gas-tight engagement with each other, the chamber 26 (shown in FIG. 1) is hermetically defined between the upper stationary frame portion 24 and the movable frame portion 25, and vacuumed through the vacuum nozzle, whereby the internal pressure of the chamber 26 is adjusted (i.e., to a predetermined reduced pressure). The vacuum nozzle may be connected to the upper plate 11 rather than to the upper stationary frame portion 24. Where the vacuum nozzle includes a plurality of vacuum nozzles connected to different portions of the upper plate 11, the internal pressure of the chamber 26 can be efficiently adjusted.

[First Flat Press Device]

Figure 3:
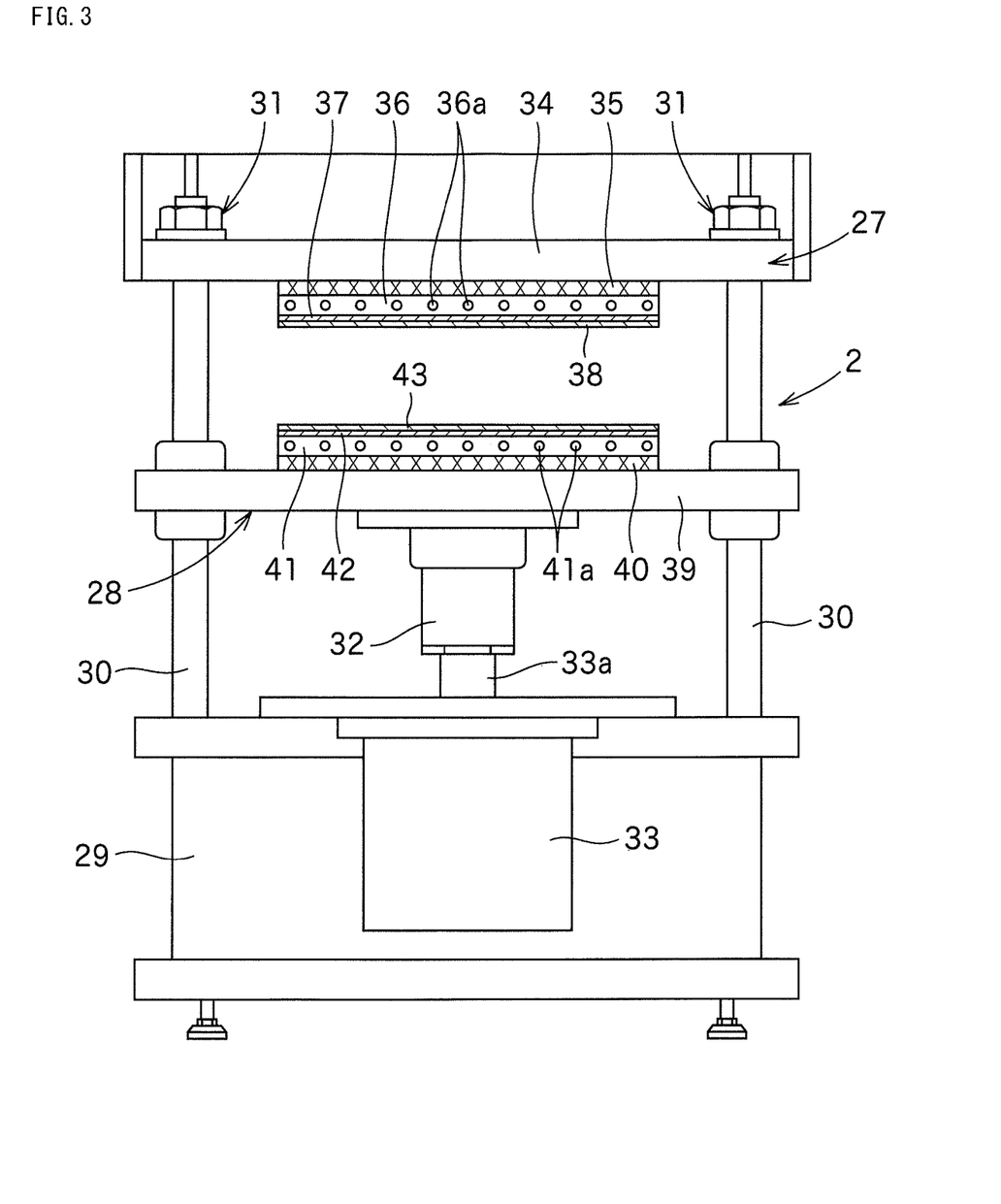
FIG. 3 is an explanatory diagram illustrating a first flat press device of the laminating apparatus.

In the first flat press device 2 (see again FIG. 1), the first temporary laminate 101 transported from the vacuum laminating device 1 by the transportation films 5, 5' is positioned between upper and lower press blocks 27 and 28 (see FIG. 3), and heat-pressed by the upper and lower press blocks 27, 28, whereby the surfaces of the first temporary laminate 101 are planarized. In this embodiment, as shown in FIG. 3, the first flat press device 2 includes a plurality of columns 30 (in FIG. 3, only two columns 30 are shown) disposed upright on a press base 29. The upper press block 27 is fixed to the columns 30 by fixtures 31 such as bolts and nuts, and the lower press block 28 is attached to the columns 30 in a vertically movable manner. The lower press block 28 is connected to a hydraulic cylinder 33 via a joint 32, and is moved up and down by operation of the hydraulic cylinder 33 (by upward and downward movement of a piston rod 33a). In this embodiment, the hydraulic cylinder 33 is connected to the lower press block 28, but a different lift mechanism such as air cylinder may be used instead of the hydraulic cylinder 33. However, the hydraulic cylinder 33 advantageously has a compact size and yet is capable of generating a high pressure.

Of the upper and lower press blocks 27, 28, the upper press block 27 is configured such that a plate-shaped upper heat insulator 35, an upper heating platen 36, a plate-shaped upper shock absorber 37, and an upper flexible metal plate (plate member) 38 are fixed to an upper base 34 in this order from the upper side, and the lower press block is configured such that a plate-shaped lower heat insulator 40, a lower heating platen 41, a plate-shaped lower shock absorber 42, and a lower flexible metal plate (plate member) 43 are fixed to a lower base 39 in this order from the lower side.

The upper heat insulator 35 is fixed to a lower surface of the upper base 34 by fixtures (not shown) such as bolts and nuts. The upper heating platen 36 is fixed to the upper base 34 via the upper heat insulator 35, and the upper flexible metal plate (plate member) 38 is fixed to the upper heating platen 36 via the upper shock absorber 37 by fixtures (not shown) such as bolts and collars. The lower heat insulator 40 is fixed to an upper surface of the lower base 39 by fixtures (not shown) such as bolts and nuts. The lower heating platen 41 is co-fixed to the lower base 39 via the lower heat insulator 40, and the lower flexible metal plate (plate member) 43 is fixed to the lower heating platen 41 via the lower shock absorber 42 by fixtures (not shown) such as bolts and collars. In FIG. 3, reference characters 36a, 41a each denote sheath heaters which are disposed in juxtaposition within the upper and lower heating platens 36, 41. In this embodiment, the sheath heaters 36a, 41a are provided within the heating platens 36, 41, but some other heat sources may be used instead of the sheath heaters 36a, 41a.

The shock absorbers 37, 42 preferably each have a surface Shore-A hardness (durometer hardness) of not lower than 60, more preferably 65 to 75. Where the surface Shore-A hardness falls within the aforementioned range, the films 106 are each allowed to have a uniform thickness after the pressing. In the present disclosure, the Shore-A hardness is measured by means of a type-A durometer in conformity with JIS K6253. The Shore-A hardness may be determined by using a test piece formed from rubber or synthetic resin of the shock absorbers.

The shock absorbers 37, 42 typically each have a thickness of 0.2 to 20 mm, preferably 0.2 to 10 mm, more preferably 0.5 to 3 mm. Where the thicknesses of the shock absorbers 37, 42 fall within the aforementioned range, the shock absorbers 37, 42 can each provide a sufficient shock absorbing effect, thereby making it possible to press the irregular surfaces of the first temporary laminate 101 in a more conformal manner. Therefore, irregular steps of the irregular surfaces of the first temporary laminate 101 can be smoothed. The shock absorbers 37, 42 may have different thicknesses, or may have the same thickness.

Exemplary materials for the shock absorbers 37, 42 include paper, rubber, synthetic resin, and fibers. Of these, the rubber is preferred, and fluororubber is particularly preferred. Examples of the fluororubber include vinylidene fluoride rubber, fluorine-containing silicone rubber, tetrafluoroethylene rubber, fluorine-containing vinyl ether rubber, fluorine-containing phosphonitrile rubber, fluorine-containing acrylate rubber, fluorine-containing nitroso methane rubber, fluorine-containing polyester rubber, and fluorine-containing triazine rubber. The shock absorbers 37, 42 may incorporate heat-resistant resin, glass fiber sheet, metal foil sheet, or the like. For example, the shock absorbers 37, 42 may be made of a composite material containing rubber and fibers in combination. The shock absorbers 37, 42 may be made of different materials, or may be made of the same material.

The flexible metal plates (plate members) 38, 43 typically each have a thickness of 0.1 to 10 mm, preferably 1 to 2 mm. Where the thicknesses of the flexible metal plates (plate members) 38, 43 fall within the aforementioned range, the flexible metal plates (plate members) 38, 43 each have a sufficient mechanical strength and a sufficient flexibility. When the shock absorbers 37, 42 conform to the irregular surfaces of the first temporary laminate 101 to be thereby deformed, the flexible metal plates (plate members) 38, 43 can sufficiently conform to the deformation of the shock absorbers 37, 42.

Exemplary materials for the flexible metal plates (plate members) 38, 43 include stainless steel, iron, aluminum, and aluminum alloys. Particularly, stainless steel is preferred because of its excellent rust resistance. Where the flexible metal plates (plate members) 38, 43 each have a mirror surface polished with buffing, the resulting second temporary laminate 102 advantageously has mirror surfaces.

[Second Flat Press Device]

Figure 4:
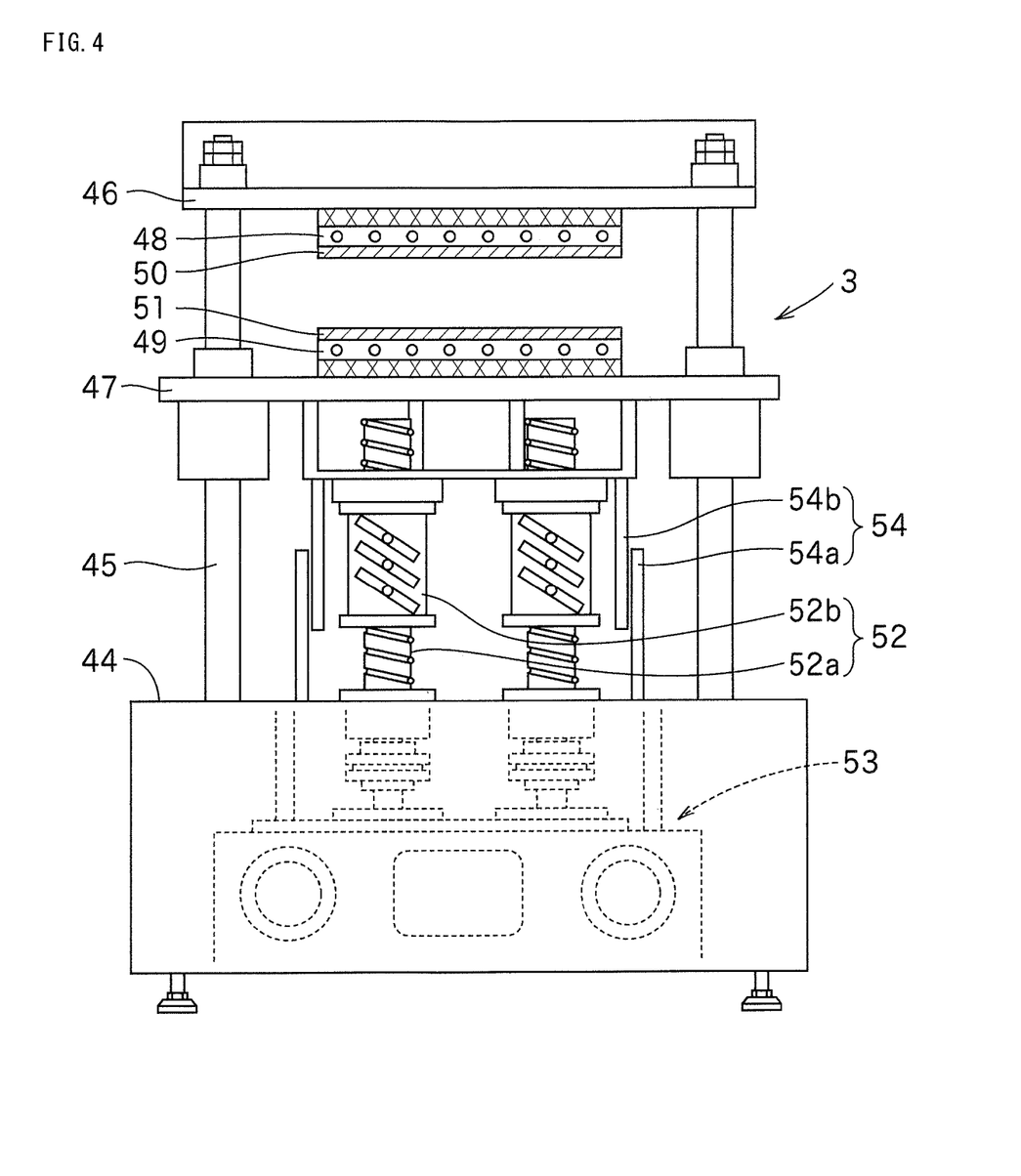
FIG. 4 is an explanatory diagram illustrating a second flat press device of the laminating apparatus.

The second flat press device 3 (see again FIG. 1) is configured so that the second temporary laminate 102 transported from the first flat press device 2 by the transportation films 5, 5' is positioned between upper and lower press blocks 46 and 47 (see FIG. 4) and heat-pressed by the upper and lower press blocks 46 and 47 to further planarize the surfaces of the second temporary laminate 102. In this embodiment, as shown in FIG. 4, the second flat press device 3 has substantially the same basic construction as the first flat press device 2 (see FIG. 3), and includes a plurality of the columns 45 (in FIG. 4, only two of four corner columns 45 are shown) disposed upright on a press base 44. The upper press block 46 is fixed to the columns 45 by fixtures such as bolts and nuts, and the lower press block 47 is attached to the columns 45 in a vertically movable manner.

Heating platens 48, 49 each incorporating a heater therein are respectively attached to the inner sides (press sides) of the upper and lower press blocks 46, 47 via heat insulators, and metal plates (plate members) 50, 51 are respectively provided on inner sides (press sides) of the heating platens 48, 49. The second temporary laminate 102 formed by the first flat press device 2 is pressed between the metal plates (plate members) 50 and 51 to be thereby allowed to have a uniform thickness. Thus, the product laminate 103 is formed as having planar mirror surfaces.

No shock absorbers are provided on the inner sides (press sides) of the heating platens 48, 49 on the press blocks 46, 47. Therefore, the surface planarities of the inner surfaces (press surfaces) of the heating platens 48, 49 can be more reliably transferred to the second temporary laminate 102, whereby the product laminate 103 thus formed has planar mirror surfaces. Depending upon the types of the substrate 104 and the films 106, shock absorbers may be respectively provided between the heating platens 48, 49 and the metal plates (plate members) 50, 51. In this case, the shock absorbers preferably each have a lower shock absorbing effect. The shock absorbing effect is typically determined by the material and the thickness of the shock absorber. In the present disclosure, the conformability of the shock absorber is also used as an index of the shock absorbing effect. That is, a shock absorber having a higher conformability is regarded as having a higher shock absorbing effect.

Where the shock absorbers are provided in the second flat press device 3, the shock absorbers preferably each have a surface Shore-A hardness of not lower than 60, more preferably 65 to 75. Where the surface Shore-A hardnesses of the shock absorbers fall within the aforementioned range, the films (laminate) each have a more uniform thickness after the pressing.

Where the shock absorbers are provided in the second flat press device 3, the shock absorbers typically each have a thickness of 0.2 to 20 mm, preferably 0.2 to 3 mm, more preferably 0.2 to 1 mm. Where the shock absorbers each have a lower shock absorbing effect than the shock absorbers 37, 42 of the first flat press device 2, the surface planarities of the inner surfaces (press surfaces) of the heating platens 48, 49 can be more reliably transferred to the second temporary laminate 102. Thus, the product laminate 103 can be formed as having more planar surfaces. The shock absorbers may be made of the same material as in the first flat press device 2, but are preferably made of a synthetic resin or a composite material containing the synthetic resin.

The metal plates (plate members) 50, 51 respectively attached to the inner sides (press sides) of the press blocks 46, 47 typically each have a thickness of 0.1 to 10 mm, preferably 0.5 to 7 mm, more preferably 1 to mm, still more preferably 2 to 5 mm. Where the thicknesses of the metal plates 50, 51 fall within the aforementioned range, the metal plates 50, 51 are excellent in mechanical strength. Therefore, the thickness of the second temporary laminate 102 can be made more uniform. Thus, the product laminate 103 can be formed as having more planar surfaces. Where the metal plates (plate members) 50, 51 each have a mirror surface polished with buffing, the resulting laminate 103 advantageously has uniform mirror surfaces.

Exemplary materials for the metal plates (plate members) 50, 51 include stainless steel, iron, aluminum, and aluminum alloys. Particularly, stainless steel is preferred because of its excellent rust resistance. The metal plates (plate members) 50, 51 may have flexibility, or may have no flexibility. Where the shock absorbers are used, the metal plates (plate members) 50, 51 are preferably less flexible so as to prevent the shock absorbers from exhibiting their shock absorbing effect to excess.

In a space below the press block 47, a lift mechanism is provided, which includes ball screws 52 each including a screw shaft 52*a* and a nut (ball nut) 52*b*, and a servomotor 53 connected to the screw shafts 52*a* of the ball screws 52. The rotation speed of the servomotor 53 is controlled by a servo amplifier (not shown) based on a command signal applied from a programmable logic controller (PLC) and feedback information of a distance between the press blocks 46 and 47. That is, the lower press block 47 is connected to the nuts 52*b* of the ball screws 52 via a joint (not shown). Thus, the press block 47 can be controlled in a vertically movable manner by controlling the rotation of the servomotor 53 connected to the screw shafts 52*a*.

A linear scale 54 which measures a distance between the press block 47 and the press base 44 is also provided in the space below the press block 47. The linear scale 54 includes a scale 54*a* fixed to the press base 44, and an encoder head 54*b* attached to the press block 47 and vertically slidable in synchronism with the press block 47. The linear scale 54 indirectly measures the distance (gap) between the upper press block 46 and the lower press block which is moved up and down by the rotation of the servomotor 53. In the present disclosure, the servomotor means a motor having a servo mechanism, and its use applications are not limited.

A linear scale (linear encoder) of magnetic type having a magnetic head or a linear scale (linear encoder) of optical type having light emitting and receiving elements may be used as the linear scale 54. Further, a distance meter of another type capable of directly or indirectly measuring the distance between the press blocks 46 and 47 in a contact manner or in a noncontact manner may be used instead of the linear scale 54.

The linear scale 54 may be provided so that the distance between the lower press block 47 and the upper press block 46 can be directly measured. Where the linear scale 54 is provided between the press blocks 46 and 47, however, the linear scale 54 is liable to be thermally influenced by the heating platens 48, 49. Without consideration of the thermal influence, it may be difficult to accurately measure the distance. Therefore, the linear scale 54 is preferably disposed apart from the heating platens 48, 49 below the press block 47, as in this exemplary arrangement, to measure the distance between the press block 47 and the press base 44, i.e., to indirectly measure the distance between the lower press block 47 and the upper press block 46.

The second flat press device 3 further includes the servo amplifier (not shown) which controls the rotation of the servomotor 53 based on the command signal applied from the PLC and the feedback information of the distance between the press blocks 46 and 47. The distance between the press blocks 46 and 47 is controlled by a press distance control unit not only based on the command signal (press distance control program) of the PLC but also in consideration of a distance signal applied from the linear scale 54. That is, the rotation of the servomotor 53 to be operated based on the command signal applied from the PLC is feedback-controlled based on the information of the distance between the press blocks 46 and 47 applied from the linear scale 54. In this exemplary arrangement, the press block 47 is moved up by rotating the servomotor 53 based on the command signal from the PLC and, when the distance between the press blocks 46 and 47 (the information of the distance between the press blocks 46 and 47 applied from the linear scale) reaches a predetermined level, this information is fed back into the command signal of the PLC to reduce the rotation speed of the servomotor 53 or stop the rotation of the servomotor 53. Thus, the stop position of the press block 47 can be accurately set, and the distance between the press blocks 46 and 47 can be accurately set.

[Transportation Devices]

The transportation device 4 (see again FIG. 1) includes upper and lower transportation film feeding devices 55, 55' disposed at a start point of the process, and the loading conveyor 7 for loading the workpieces 100 into the process, while the transportation device 4' includes transportation film winding devices 56, 56' disposed at an end point of the process. A plurality of guide rollers which support the transportation films 5, 5' for transporting the workpieces 100 and the like are provided at different process points.

The workpieces 100 individually supplied at a predetermined interval from the loading conveyor 7 are continually (intermittently) loaded at a predetermined time interval and held between the upper and lower transportation films 5 and 5' respectively fed out from the transportation film feeding devices 55, 55'. In synchronism with the flow (movement) of the transportation films 5, 5' guided by the guide rollers, the workpieces 100 are each transported through a gap between the upper plate 11 and the lower plate 12 of the vacuum laminating device 1, through a gap between the upper press block 27 and the lower press block 28 of the first flat press device 2, through a gap between the upper press block 46 and the lower press block 47 of the second flat press device 3, and then through a space between the fans 6 and 6' for cooling the resulting product laminate 103. The product laminate 103, after being cooled, is released from the upper and lower transportation films 5, 5', and unloaded from the transportation device 4'.

The upper and lower transportation films 5, 5' from which the product laminate 103 is unloaded are respectively wound up by the transportation film winding devices 56, 56'. The transportation films 5, 5' thus wound up are typically discarded, but may be recycled as required.

Figure 5:
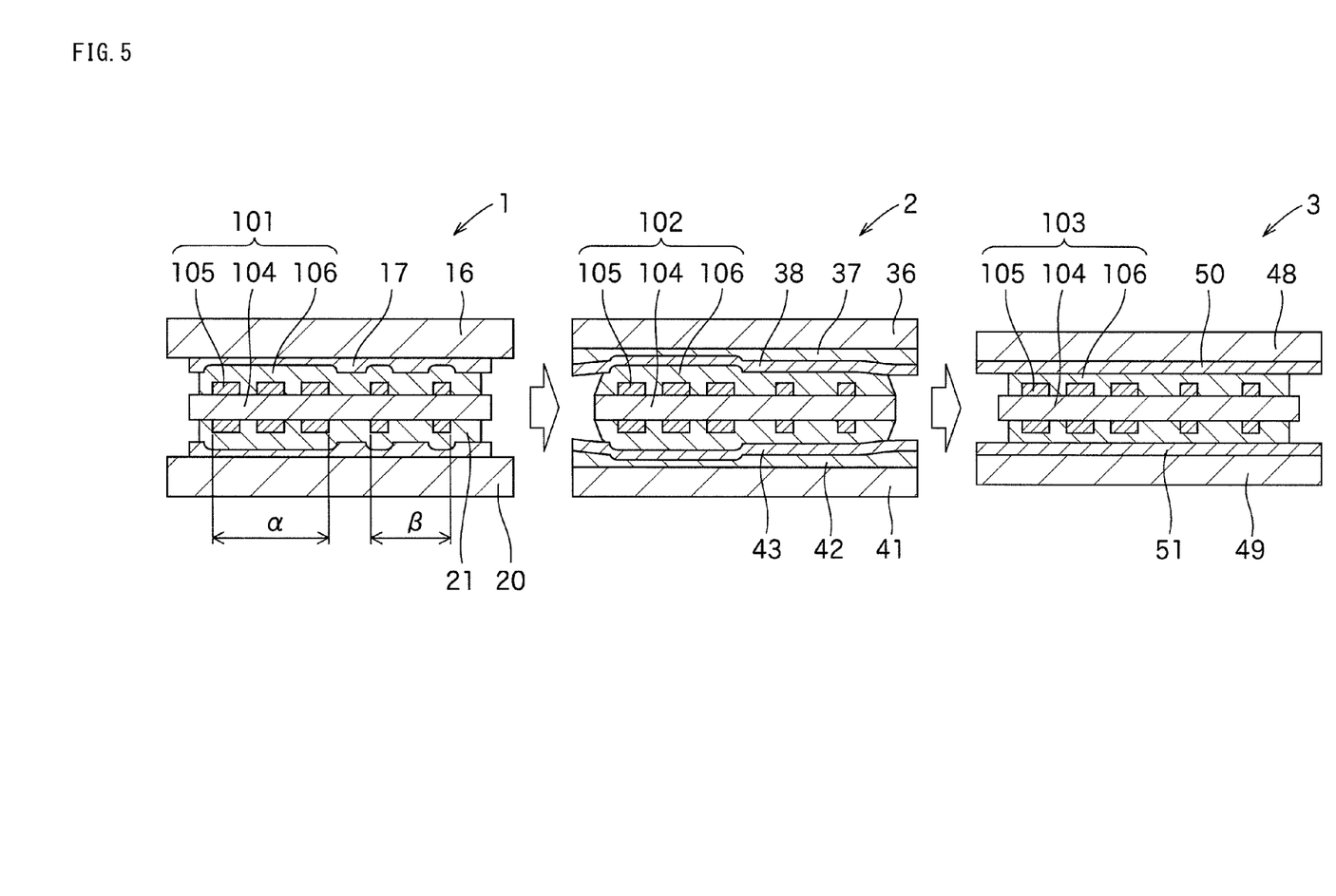
FIG. 5 is an explanatory diagram illustrating a first temporary laminate, a second temporary laminate, and a product laminate formed by the respective devices of the laminating apparatus.

With this arrangement, the laminating apparatus includes, for example, the vacuum laminating device 1, the first flat press device 2 including the hydraulic cylinder 33, the thicker shock absorbers 37, 42 (each having a higher shock absorbing effect), and the thinner plate members 38, 43, and the second flat press device 3 including the servomotor 53, the thicker plate members 50, 51, and no shock absorber. As shown in FIG. 5, a prepared workpiece 100 is processed by the vacuum laminating device 1, whereby the first temporary laminate 101 can be formed, which includes the substrate 104 having the irregular surfaces (each provided with the copper pattern 105) and the films 106 kept in close conformal contact with the irregular surfaces. The first temporary laminate 101 has irregular surfaces substantially conformal to the irregular surfaces of the substrate 104 (each provided with the copper pattern 105). Then, the first temporary laminate 101 is processed by the first flat press device 2, whereby the irregular surfaces of the first temporary laminate 101 can be pressed to be substantially planarized. Thus, the second temporary laminate 102 can be formed as having substantially planarized irregular surfaces. Further, the second temporary laminate 102 is processed by the second flat press device 3, whereby the substantially planarized irregular surfaces of the second temporary laminate 102 can be pressed by the flat surfaces of the metal plates 50, 51, which maintain their planarities. Thus, the product laminate 103 can be formed as having mirror surfaces planarized to an unprecedented level with no irregularities with the films 106 protruding slightly. In FIG. 5, the process and the devices are schematically shown, and components not necessary for the description are not shown.

Next, a laminating apparatus according to a second embodiment of the present disclosure will be described. This laminating apparatus has substantially the same construction as the laminating apparatus shown in FIG. 1, except that a second flat press device 57 is provided instead of the second flat press device 3. The second flat press device 57 is partially illustrated in FIG. 6.

The second flat press device 57 has substantially the same basic construction as the first flat press device 2 shown in FIG. 3 (arranged to move up and down the press block by the hydraulic cylinder), except that the shock absorbers and the flexible metal plates (plate members) are different in thickness from the shock absorbers 37, 42 and the flexible metal plates 38, 43 of the first flat press device 2 shown in FIG. 3.

Figure 6:
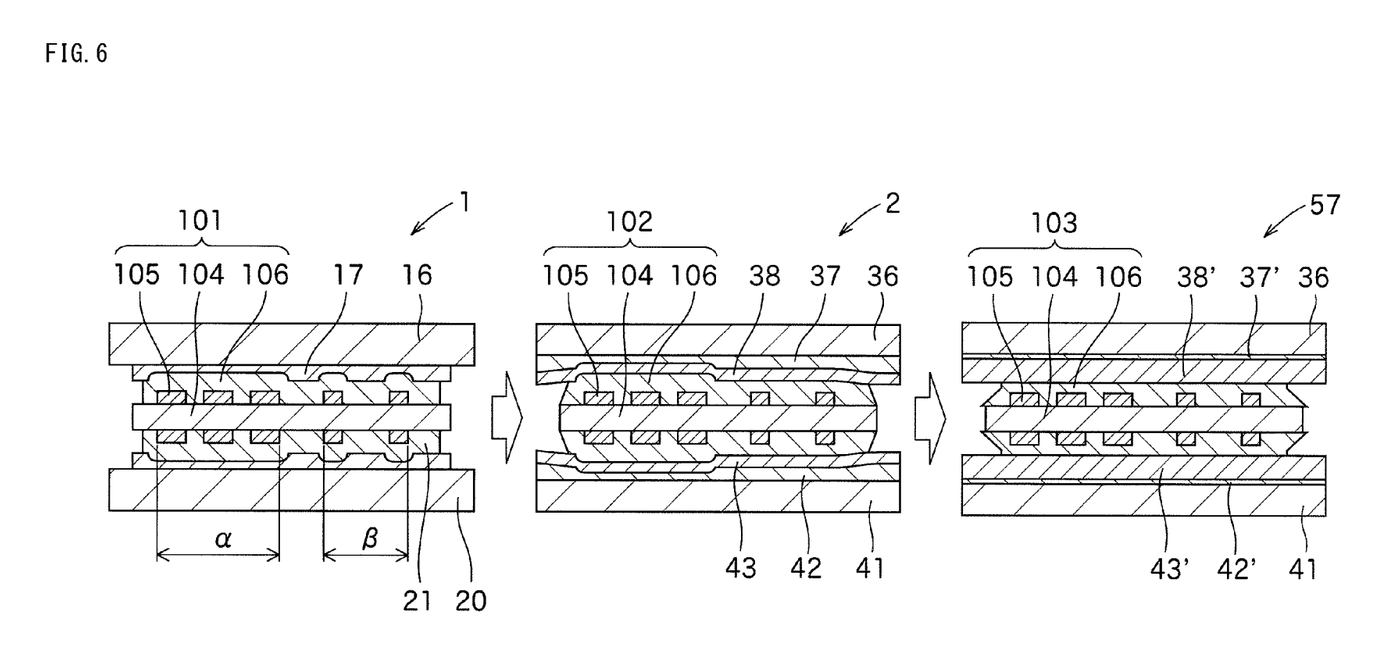
FIG. 6 is an explanatory diagram illustrating a first temporary laminate, a second temporary laminate, and a product laminate formed by respective devices of a laminating apparatus according to another embodiment of the present disclosure.

In the second flat press device 57, as shown in FIG. 6, the upper shock absorber 37' and the lower shock absorber 42' each have a lower shock absorbing effect than in the first flat press device 2, and a preferred material for the upper shock absorber 37' and the lower shock absorber 42' is different from that in the first flat press device 2. Further, the upper flexible metal plate (plate member) 38' and the lower flexible metal plate (plate member) 43' are more excellent in mechanical strength than in the first flat press device 2. In the second flat press device 57, the other components are the same as those in the first flat press device 2 shown in FIG. 3 and, therefore, no description will be given thereof. In FIG. 6, the process and the devices are schematically shown, and components not necessary for the description are not shown.

Exemplary materials for the upper shock absorber 37' and the lower shock absorber 42' include the same materials as in the first flat press device 2. Particularly, a synthetic resin and a composite material containing the synthetic resin are preferred.

The upper shock absorber 37' and the lower shock absorber 42' typically each have a thickness of 0.2 to 20 mm, preferably 0.2 to 3 mm, more preferably 0.2 to 1 mm. Where the thicknesses of the shock absorbers 37', 42' fall within the aforementioned range, the shock absorbing effect is not excessive. Therefore, the surface planarities of the metal plate (plate member) 50' and the metal plate (plate member) 51' can be more reliably transferred to the surfaces of the second temporary laminate 102. Thus, the product laminate 103 can be formed as having planar mirror surfaces. The shock absorbers 37', 42' may be made of different materials as having different thicknesses, or may be made of the same material as having the same thickness.

The upper flexible metal plate (plate member) 38' and the lower flexible metal plate (plate member) 43' typically each have a thickness of 0.1 to 10 mm, preferably 1 to 5 mm, more preferably 2 to 3 mm. Where the thicknesses of the flexible metal plates 38', 43' fall within the aforementioned range, the flexible metal plates 38', 43' are excellent in mechanical strength, whereby the thickness of the second temporary laminate 102 can be made uniform. Thus, the product laminate 103 can be formed as having planar surfaces. Where the flexible metal plates (plate members) 38', 43' each have a mirror surface polished with buffing, the product laminate 103 advantageously has uniform mirror surfaces.

With this arrangement, the laminating apparatus according to the second embodiment of the present disclosure includes the vacuum laminating device 1, the first flat press device 2 including the hydraulic cylinder 33, the shock absorbers 37, 42 having a higher shock absorbing effect, and the thinner plate members 38, 43, and the second flat press device 57 including the hydraulic cylinder 33, the shock absorbers 37', 42' having a lower shock absorbing effect, and the thicker plate members 38', 43'. As shown in FIG. 6, a prepared workpiece 100 is first processed by the vacuum laminating device 1, whereby the first temporary laminate 101 can be formed, which includes the substrate 104 having the irregular surfaces (each provided with the copper pattern 105) and the films 106 kept in close conformal contact with the irregular surfaces. The first temporary laminate 101 has irregular surfaces substantially conformal to the irregular surfaces of the substrate 104 (each provided with the copper pattern 105). Then, the first temporary laminate 101 is processed by the first flat press device 2, whereby the irregular surfaces of the first temporary laminate 101 can be pressed to be substantially planarized. Thus, the second temporary laminate 102 can be formed as having substantially planarized irregular surfaces. Further, the second temporary laminate 102 is processed by the second flat press device 3, whereby the substantially planarized irregular surfaces of the second temporary laminate 102 are pressed by the flat surfaces of the upper flexible metal plate (plate member) 38' and the lower flexible metal plate (plate member) 43', which maintain their planarities. Thus, the product laminate 103 can be formed as having mirror surfaces planarized to an unprecedented level with no irregularities. In the laminating apparatus (including the second flat press device 3) shown in FIG. 1, however, the distance between the metal plate (plate member) 50 and the metal plate (plate member) 51 can be more easily controlled to the predetermined level, so that the protrusion amount of the films 106 can be reduced during the pressing in the second flat press device 3.

In the embodiments of the present disclosure described above, the temperatures and the pressures to be employed in the first flat press device 2 and the second flat press device 3 (or 57) during the pressing may be properly selected according to the materials of the substrate 104 and the films 106. In order to ensure excellent surface finish (planarity and mirror finish) of the product laminate 103, the press conditions are particularly preferably such that the first flat press device 2 employs a higher temperature and a lower pressure than the second flat press device 3 (or 57). Further, the second flat press device 3 (or 57) preferably employs a longer press period than the first flat press device 2.

EXAMPLES

The embodiments of the present disclosure will hereinafter be described specifically by way of examples. It should be understood that the present disclosure be not limited to these examples within the scope of the present disclosure.

Example 1

The laminating apparatus shown in FIG. 1 was used. A workpiece 100 was prepared, which included a substrate 104 having irregular surfaces (each provided with a copper pattern 105, and having an irregularity height of 18 μm, a remaining copper pattern percentage of 80% in an area α, a remaining copper pattern percentage of 30% in an area β, and a remaining copper pattern percentage of 0% in an area γ (see FIG. 7A)) and epoxy films 106 having a thickness of 40 μm placed on the irregular surfaces of the substrate 104.

In the vacuum laminating device 1, the chamber 26 was preliminarily conditioned at 110° C. by the upper heating platen 16 and the lower heating platen 20, and further conditioned at an internal pressure of not higher than 100 Pa after a lapse of 30 seconds from the start of vacuuming. Then, the workpiece 100 was pressed at 1 MPa between the upper elastic press plate 17 and the lower elastic press plate 21 each having a thickness of 2 mm for 20 seconds, whereby a first temporary laminate 101 was formed.

In the first flat press device 2, stainless steel plate members (made of stainless steel JIS SUS630H, and having a thickness of 2 mm) were used as the upper flexible metal plate (plate member) 38 and the lower flexible metal plate (plate member) 43, and 2.5-mm thick vinylidene fluoride rubber sheets were used as the upper shock absorber 37 and the lower shock absorber 42. Then, the upper heating platen 36 and the lower heating platen 41 were conditioned at 120° C., and the lower press block 28 was moved up by the hydraulic cylinder 33, whereby the first temporary laminate 101 was heat-pressed at a pressure of 0.8 MPa between the upper flexible metal plate (plate member) 38 and the lower flexible metal plate (plate member) 43 for 30 seconds. Thus, a second temporary laminate 102 was formed.

In the second flat press device 3, the heating platens 48, 49 were conditioned at 100° C., and the lower press block 47 was moved up by the servomotor 53, whereby the distance between the 2-mm thick metal plate (plate member) 50 and the 2-mm thick metal plate (plate member) 51 was set so as to be equal to the thickness of the second temporary laminate 102 minus 20 μm. In this state, the second temporary laminate 102 was pressed between the metal plate (plate member) 50 and the metal plate (plate member) 51 for 60 seconds. Thus, a product laminate 103 was formed.

Example 2

The laminating apparatus having substantially the same construction as the laminating apparatus shown in FIG. 1 except that the second flat press device 57 (see FIG. 6) was provided instead of the second flat press device 3 was used. A product laminate 103 was formed in substantially the same manner as in Example 1, except that the laminating apparatus including the second flat press device 57 was used.

In the second flat press device 57, stainless steel plate members (made of stainless steel JIS SUS630H, and having a thickness of 3 mm) were used as the upper flexible metal plate (plate member) 38' and the lower flexible metal plate (plate member) 43', and 0.5-mm thick vinylidene fluoride rubber plates were used as the upper shock absorber 37' and the lower shock absorber 42'. Then, the upper heating platen 36 and the lower heating platen 41 were conditioned at 100° C., and the lower press block 28 was moved up by the hydraulic cylinder 33, whereby the second temporary laminate 102 was heat-pressed at a pressure of 0.8 MPa between the upper flexible metal plate (plate member) 38' and the lower flexible metal plate (plate member) 43' for 60 seconds. Thus, the product laminate 103 was formed.

Comparative Example 1

A product laminate 103 was formed in substantially the same manner as in Example 1 by using a laminating apparatus having substantially the same construction as the laminating apparatus shown in FIG. 1 except that the second flat press device 3 was not provided. That is, Comparative Example 1 corresponds to the conventional art in which the product laminate is formed by using the laminating apparatus including the vacuum laminating device and the single flat press device (arranged to move up and down the press block by the hydraulic cylinder).

Comparative Example 2

A product laminate 103 was formed in substantially the same manner as in Example 1 by using a laminating apparatus having substantially the same construction as the laminating apparatus shown in FIG. 1 except that the first flat press device 2 was not provided. That is, Comparative Example 2 corresponds to the conventional art in which the product laminate is formed by using the laminating apparatus including the vacuum laminating device and the single flat press device (arranged to move up and down the press block by the servomotor).

The product laminates 103 formed in Examples 1 and 2, and Comparative Examples 1 and 2 were each evaluated for thickness variation and mirror surface smoothness in the following manner:

[Thickness Variation]

The thickness of each of the product laminates 103 was measured at three points (in the three areas α, β, γ, respectively, shown in FIGS. 7A, 7B, and 7C), and a difference between the maximum thickness and the minimum thickness out of the measured thicknesses was calculated. The product laminates 103 were each evaluated based on the calculated difference according to the following criteria, and the results of the evaluation are shown below in Table 1.

○ (excellent): The thickness difference was not greater than 2 μm.

Δ (acceptable): The thickness difference was greater than 2 μm and not greater than 6 μm.

x (unacceptable): The thickness difference was greater than 6 μm.

[Mirror Surface Smoothness]

The surface of each of the product laminates 103 was visually observed. The product laminates 103 were each evaluated according to the following criteria, and the results of the evaluation are shown below in Table 1.

○ (acceptable): No void was observed.

x (unacceptable): Voids were observed.

TABLE 1

|  | Thickness variation | Mirror surface smoothness |
| --- | --- | --- |
| Example 1 | ○ | ○ |
| Example 2 | Δ | ○ |
| Comparative Example 1 | x | ○ |
| Comparative Example 2 | ○ | x |

As shown in Table 1, the product laminate 103 of Example 1 was free from thickness variation and excellent in mirror surface smoothness (see FIG. 7A), because the metal plates (plate members) 50, 51 have no conformability and the second temporary laminate 102 is excellent in planarity.

That is, the product laminate 103 of Example 1 had excellent mirror surface smoothness, because the first flat press device 2 provides a higher surface conformability. Further, the product laminate 103 of Example 1 was substantially free from the thickness variation, because the second flat press device 3 provides a lower surface conformability.

In Example 1, the second flat press device 3 (arranged to move up and down the press block by the servomotor) can accurately set the distance between the metal plates (plate members) 50 and 51 during the pressing, thereby suppressing the application of an excess pressure during the pressing. Therefore, the softened films 106 were prevented from protruding from the gap between the upper press block 46 and the lower press block 47.

Figure 7A:
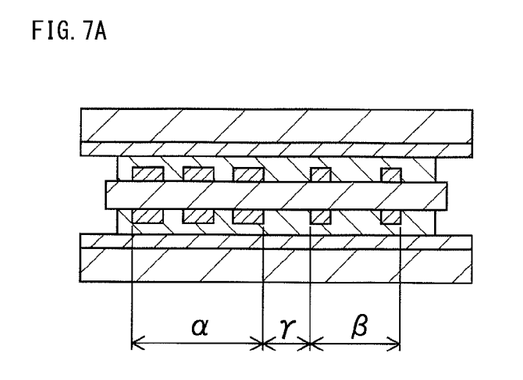
FIG. 7A is an explanatory diagram illustrating a product laminate (Example) produced by using the laminating apparatus according to the embodiment of the present disclosure.
Figure 7B:
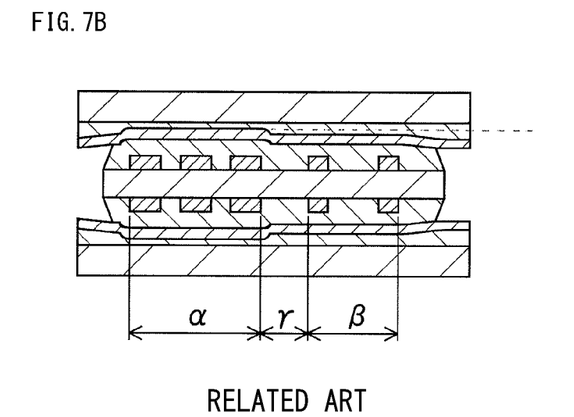
FIGS. 7B and 7C are explanatory diagrams illustrating product laminates (Comparative Examples) each produced by using a conventional laminating apparatus.
Figure 7C:
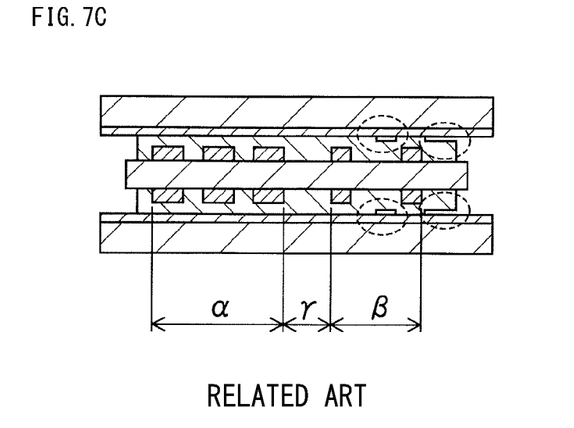

The product laminate 103 of Example 2 was substantially free from the thickness variation, and excellent in mirror surface smoothness as in Example 1 (see FIG. 7A). In Example 2, however, the softened films slightly protruded from the gap between the upper and lower press blocks. This is because the shock absorbers 37', 42' of the second flat press device 57 (arranged to move up and down the press block by the hydraulic cylinder) each have a smaller thickness, failing to provide a sufficient shock absorbing effect against an excess pressure applied during the pressing.

In comparative Example 1, the shock absorbers 37, 42 of the first flat press device 2 each have a sufficient thickness and, therefore, can be deformed to conform to the irregularities of the first temporary laminate 101, making it possible to smooth the irregular surfaces of the first temporary laminate 101. Therefore, the product laminate 103 of Comparative Example 1 was excellent in mirror surface smoothness. However, as shown by a broken line in FIG. 7B, the product laminate 103 suffered from thickness variation, because the steps of the irregular surface occurring due to the difference in the remaining copper percentage of the copper pattern 105 cannot be perfectly smoothed.

The product laminate 103 of Comparative Example 2 was formed through the press operation performed by the second flat press device 3 immediately after the processing by the vacuum laminating device 1. The product laminate 103 of Comparative Example 2 was substantially free from the thickness variation, but was poorer in mirror surface smoothness with some unpressed portions present on greater steps of the irregular surfaces as indicated by broken line enclosures in FIG. 7C, because the first temporary laminate 101 cannot be pressed with its irregular surfaces in conformal contact with the metal plates.

While specific forms of the embodiments of the present disclosure have been shown in the aforementioned examples, the examples are merely illustrative but not limitative. It is contemplated that various modifications apparent to those skilled in the art could be made within the scope of the disclosure.

The laminating apparatus according to the present disclosure can be used for production of a laminate having a highly planarized surface.

The invention claimed is:

1. A laminating apparatus for laminating a film on an irregular surface of a substrate having irregularities, the apparatus comprising:
    a vacuum laminating device which brings the film into close conformal contact with the substrate under reduced pressure to form a first temporary laminate having an irregular surface substantially conformal to the irregular surface of the substrate;
    a first flat press device which presses the first temporary laminate to substantially planarize the irregular surface of the first temporary laminate to form a second temporary laminate having a substantially planarized irregular surface; and
    a second flat press device which presses the second temporary laminate under different conditions from the first flat press device to further planarize the irregular surface of the second temporary laminate to form a product laminate having a planar surface,
    wherein the first flat press device comprises a pair of first plates opposed to each other, at least one of the pair of first plates being movable toward and away from the other first plate, at least one of the pair of first plates including a first heating platen, a first plate member, and a first shock absorber provided between the first heating platen and the first plate member,
    wherein the second flat press device comprises a pair of second plates opposed to each other, at least one of the pair of second plates being movable toward and away from the other second plate, at least one of the pair of second plates including a second heating platen and a second plate member, and
    wherein no shock absorber is provided between the second heating platen and the second plate member.

2. The laminating apparatus according to claim 1,
    wherein the first flat press device comprises a pair of press blocks opposed to each other and a hydraulic cylinder or an air cylinder connected to at least one of the pair of press blocks, and wherein the at least one of the pair of press blocks is movable toward and away from the other press block by operation of the hydraulic cylinder or the air cylinder.

3. The laminating apparatus according to claim 1,
wherein the second flat press device comprises a pair of press blocks opposed to each other and a servomotor connected to at least one of the pair of press blocks, and
wherein the at least one of the pair of press blocks is movable toward and away from the other press block by operation of the servomotor.

4. The laminating apparatus according to claim 1,
wherein the second flat press device comprises a pair of press blocks opposed to each other and a hydraulic cylinder or an air cylinder connected to at least one of the pair of press blocks, and
the at least one of the pair of press blocks is movable toward and away from the other press block by operation of the hydraulic cylinder or the air cylinder.

* * * * *